(12) United States Patent
Dagdeviren

(10) Patent No.: US 8,671,443 B2
(45) Date of Patent: Mar. 11, 2014

(54) SYSTEM AND METHOD FOR ENSURING CONFORMANCE OF ONLINE MEDIA DISTRIBUTION TO COPYRIGHT RULES

(76) Inventor: Nuri Ruhi Dagdeviren, Tiburon, CA (US)

( * ) Notice: Subject to any disclaimer, the term of this patent is extended or adjusted under 35 U.S.C. 154(b) by 729 days.

(21) Appl. No.: 12/683,423

(22) Filed: Jan. 6, 2010

(65) Prior Publication Data

US 2011/0167254 A1    Jul. 7, 2011

(51) Int. Cl.
*G06F 7/04* (2006.01)
(52) U.S. Cl.
USPC .................................................. 726/7; 726/6
(58) Field of Classification Search
USPC ............... 726/1, 4, 5, 6, 7; 705/901; 715/741; 709/226, 229; 380/201
See application file for complete search history.

(56) References Cited

U.S. PATENT DOCUMENTS

| | | | |
|---|---|---|---|
| 7,996,672 B1* | 8/2011 | Agrawal et al. | 713/165 |
| 2007/0005778 A1* | 1/2007 | Peng et al. | 709/228 |
| 2007/0168288 A1* | 7/2007 | Bozeman | 705/51 |
| 2008/0271122 A1* | 10/2008 | Nolan et al. | 726/4 |
| 2009/0089398 A1* | 4/2009 | Lambert | 709/217 |
| 2009/0094633 A1* | 4/2009 | Choi et al. | 725/28 |
| 2009/0300767 A1* | 12/2009 | Galuten et al. | 726/26 |
| 2009/0327059 A1* | 12/2009 | Grigorovitch | 705/14.15 |
| 2010/0114739 A1* | 5/2010 | Johnston | 705/27 |
| 2011/0023124 A1* | 1/2011 | Selander et al. | 726/26 |

\* cited by examiner

*Primary Examiner* — Samson Lemma

(57) ABSTRACT

A system and a method are described for presenting media content for users to view over the internet. Rights pertaining to said media to be viewed are uploaded to servers by users holding such rights to rent or resell such media content. Servers restrict the viewing of the content in accordance with the limitations of the uploaded rights such that copyright rules are respected at all times.

14 Claims, 5 Drawing Sheets

Media Rights Record Table, Definition Example:

Media Rights Record Table, Instantiation Example:

| Identifier | Name | Type | Key | Total Records | Idle Records |
|---|---|---|---|---|---|
| 101100…1001 | "Gone with the Wind" | 0000 | 01100..1000 | 2 | 1 |
| 101100…1011 | "Ghostbusters" | 0000 | 01100..1010 | 1 | 1 |
| 101100…1100 | "Armageddon" | 0000 | 01100..1011 | 1 | 1 |
| 101100…1101 | "Painted Black" | 0001 | 01110..1010 | 1 | 1 |
| 101100…1111 | "Of Mice and Men" | 0010 | 01111..1011 | 1 | 1 |
| … | … | | … | … | … |

SYSTEM AND METHOD FOR ENSURING CONFORMANCE OF ONLINE MEDIA DISTRIBUTION TO COPYRIGHT RULES

BACKGROUND OF THE INVENTION

This application discloses an invention that is related, generally and in various embodiments, to systems and methods for managing digital media rights in conjunction with online delivery of media over the Internet. The disclosed invention can be employed to ensure conformance of online delivery of digital media with applicable copyright rules.

Media are commonly stored and delivered in digital form in the state of the art implementations. With increasing popularity of the Internet and broadband access, it has also become routine to deliver video and audio content over the Internet in addition to text and images which dominated the earlier years of Internet use. Examples are the popular video sharing site YOUTUBE where users upload short videos freely accessed by others from around the world and NETFLIX where users pay subscriptions fees to view feature films online. Also becoming popular is digital distribution of written media in the form of e-books. For example, the electronic reader KINDLE provided by Amazons Inc., allows users to download electronic versions of books and read them on their KINDLE devices.

YOUTUBE has been very successful for sharing personally produced videos. In the case of professionally produced media content, managing fair use of the content respecting the rights of the content creators has been a struggle. In the state of the art, this is frequently managed by the video serving site requiring acknowledgement that the user uploading the video holds all the necessary rights to the content he is uploading. The user typically has the right to view the content that he is uploading but not always the right to share it publicly in a manner where anyone in the world can view it on the Internet. Nevertheless, this has not stopped many users from uploading copyrighted material anyway. Such improperly uploaded content typically remains available for other users to view until the copyright owner becomes aware of its presence and requests that it be removed. As a result, current approaches result in a chase between individual users and copyright owners that is likely frustrating for all involved. This state of affairs has been an important limiting factor in using YOUTUBE or similar open public service sites for viewing copyrighted content.

Other service sites such as NETFLIX require that the viewing users pay fees on a periodic or on a per use basis so that part of the proceeds can be shared with copyright owners for allowing the use of their material. This alternative model also has been quite successful for addressing a segment of the market complementing that addressed by YOUTUBE. Techniques to provide controlled access to media over the Internet according to rights licensed off-line from copyright holders have been provided in prior art such as U.S. Pat. No. 7,562,395 (DeMello, et al., July 2009), U.S. Pat. No. 7,496,540 (Irwin, et al. February, 2009), U.S. Pat. No. 7,493,289 (Verosub, et al. February, 2009), U.S. Pat. No. 7,487,363 (Alve, et al. February, 2009), U.S. Pat. No. 7,426,637 (Risan, et al. September, 2008), U.S. Pat. No. 7,386,514 (Major, et al. June, 2008)

The approaches provided in the prior art leave out a potentially important mode of operation. Although individuals typically do not have the right to broadcast media to the world on YOUTUBE by posting movies they purchased on a DVD, they do have the right to lend, rent or resell their DVDs to anyone they choose under the doctrine of first sale based on the Copyright Act of 1976, 17 U.S.C. §109. Solutions currently available or any of the techniques provided in the prior art do not offer a mechanism for consumers to exercise their rights under the first sale doctrine in online applications on the Internet.

BRIEF SUMMARY OF THE INVENTION

In one general respect, this application discloses an online system and method for allowing consumers to exercise their rights under the doctrine of first sale with respect to digital media they own. This is accomplished by adding mechanisms to the Internet media servers to register and manage media rights of individual users based on their request. Independent of the process of uploading the media content, users upload information representing their individual rights with respect to said media content. The media server then manages the delivery of said media to other users within the constraints implied by the rights records uploaded by users holding such rights. Also presented are techniques for physical verification of rights claimed by users that can be optionally incorporated to satisfy regulatory requirements.

BRIEF DESCRIPTION OF DRAWINGS

Various embodiments of the disclosed invention will be described herein by way of example in conjunction with the following figures, wherein.

DETAILED DESCRIPTION OF THE INVENTION

Figure 1:
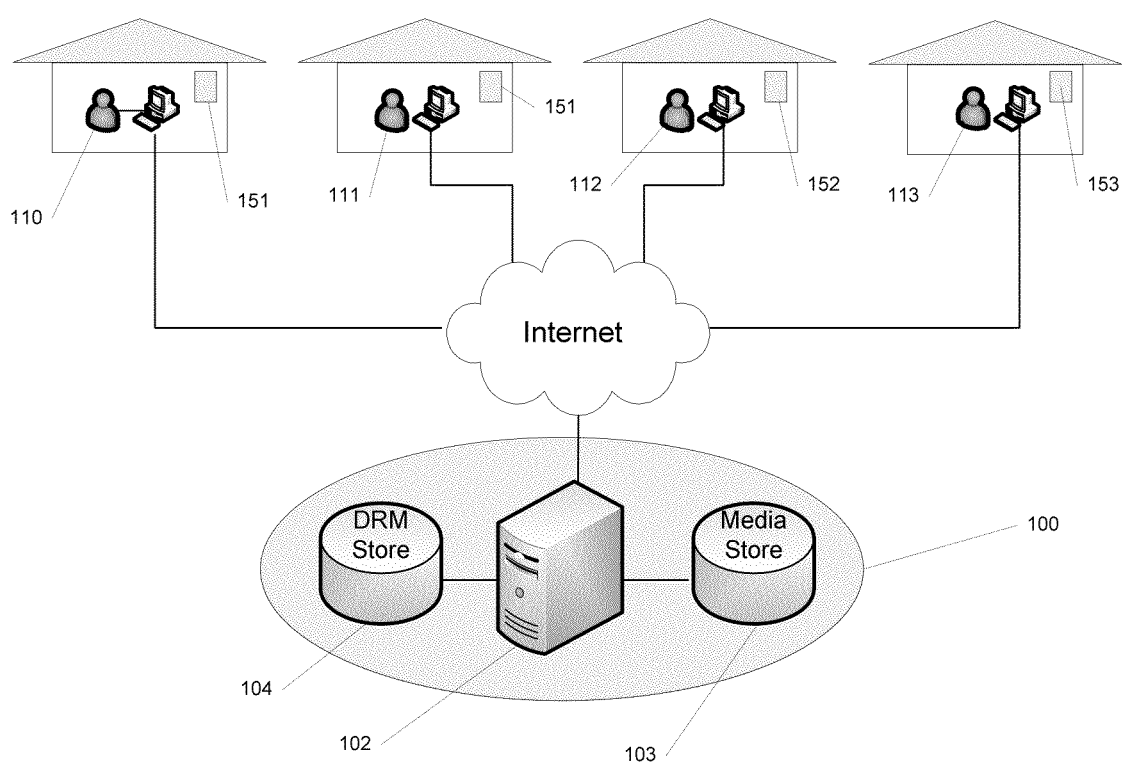
FIG. 1 is a diagram of an interactive media server and digital rights management system according to various embodiments of the disclosed invention.

FIG. 1 is a diagram of a media serving platform 100 including a media server 102, a media store 103 and a (Digital Rights Management) DRM store 104. Media store 103 is a database containing digital representation of media of interest that are presented to the users of the platform. Such a database can be constructed by storing compressed versions, for example according to the MPEG-4 standard (ISO/IEC JTC 1/SC 29, 2009-11-09), of digital representation of movies in hard disk drives. It can also contain music digitally compressed according to the MP3 standard (ISO/IEC 11172-3: 1993) or books stored in standard formats such as HTML, PDF (ISO 32000-1:2008) or proprietary formats such as the AZW format used in the Amazon.com electronic reader product KINDLE. DRM Store 104 is a database containing records of rights pertaining to the use of media contained in the Media Store 103. Such a database can be constructed by using popular relational database software such as MySQL, and creating, storing and modifying tables referencing rights records for each media item. Server 102 contains processing and networking capabilities to deliver digital media contained in database 103 over the Internet to users 110 through 113. Such a server can be created by running streaming server software such as WINDOWS MEDIA SERVICES from Microsoft or QUICKTIME server from Apple Corporation. Although servers 102, 103 and 104 are depicted here as physically distinct for the purposes of illustration, equally practical embodiments of the invention can be realized where the functionality of these servers can be incorporated within software modules on a single hardware platform or distributed across much larger number of physical servers according to the principles of distributed computing. Such flexibility in implementation is commonly employed in the state of the art and do not affect the functionality of the present invention.

In this illustrative embodiment of the present invention, each user 110 through 113 have purchased and hold the rights to view, rent or resell one movie on a DVD. Users 110 and 111 have purchased the same DVD, for example "GONE WITH THE WIND". Users 112 and 113 have purchased distinct movies, for example "ARMAGEDDON" and "GHOSTBUSTERS" respectively. After their respective purchases, they have each viewed their movies and put them away in storage shelves. If any two of the users 110-113 were to live in the same neighborhood and know of each other's common interest in movies, they could compare their libraries and exchange movies to their mutual benefit. The goal of the present invention is to facilitate the same benefit in cases where two users are not geographically close and may not have personal knowledge of each other. This is accomplished by virtualization of the exchange of DVDs while strictly tracking the use of this content to protect the interests of the copyright holders as will be illustrated in the following.

The users 100-113 all create accounts on the platform 100 allowing them to login to the platform resources with their individual credentials. In this manner, each user registers the ownership of media in his library in the DRM store 104. According to the example above, users 110 and 111 register their ownership of "GONE WITH THE WIND" contained on their DVDs 151, user 112 registers his "ARMAGEDDON" on DVD 152 and user 113 registers his "GHOSTBUSTERS" on DVD 153. These records are kept in DRM Store 104 until the owner of the record decides to delete this record.

When a request is made by a user to enter a record of ownership of a movie into the DRM store 104, the server 102 checks to see if the digital representation of the same movie is already present in Media Store 103. If such digital representation is not present, it is uploaded to the media store 103 either by the same user uploading the ownership record to DRM store 104 or through any other means available to the platform 100. This storage of the digital representation of the movie can be done only once regardless of how many records of ownership are registered in the DRM store 104 for the same movie.

When the user 112 would like to view the movie "GONE WITH THE WIND", he logs in to the platform 100 and checks whether an idle copy of this movie is available so that he can view it. Since two copies have been registered by users 110 and 111 and nobody else is watching them at the moment, the platform indicates to user 112 that an idle copy is available and starts streaming this movie to user 112 to fulfill his request.

When user 113 also decides at the same time that he would like view "GONE WITH THE WIND", he similarly logs in to platform 100 to see if an idle copy is available for viewing. Since two copies have been registered and only one is currently being viewed by user 112, the platform indicates to user 113 that indeed an idle copy is available and start streaming this movie to user 113 as well upon his request. Since the simultaneous viewing of this movie by users 112 and 113 exhausts the two records of ownership registered by users 110 and 111, no further requests of viewing "GONE WITH THE WIND" can be allowed by platform 100 until either viewing sessions of users 112 and 113 are terminated.

Similarly if either viewer 110 or 111 would like to view "ARMAGEDDON" or "GHOSTBUSTERS", they will be able to do so by logging in to the platform 100 as long as they do not wish to view the same movie at the same time. Since only one record of ownership of either of these movies were entered by users 110 and 111, only one user will be allowed to watch this movie at any given time.

Figure 2:
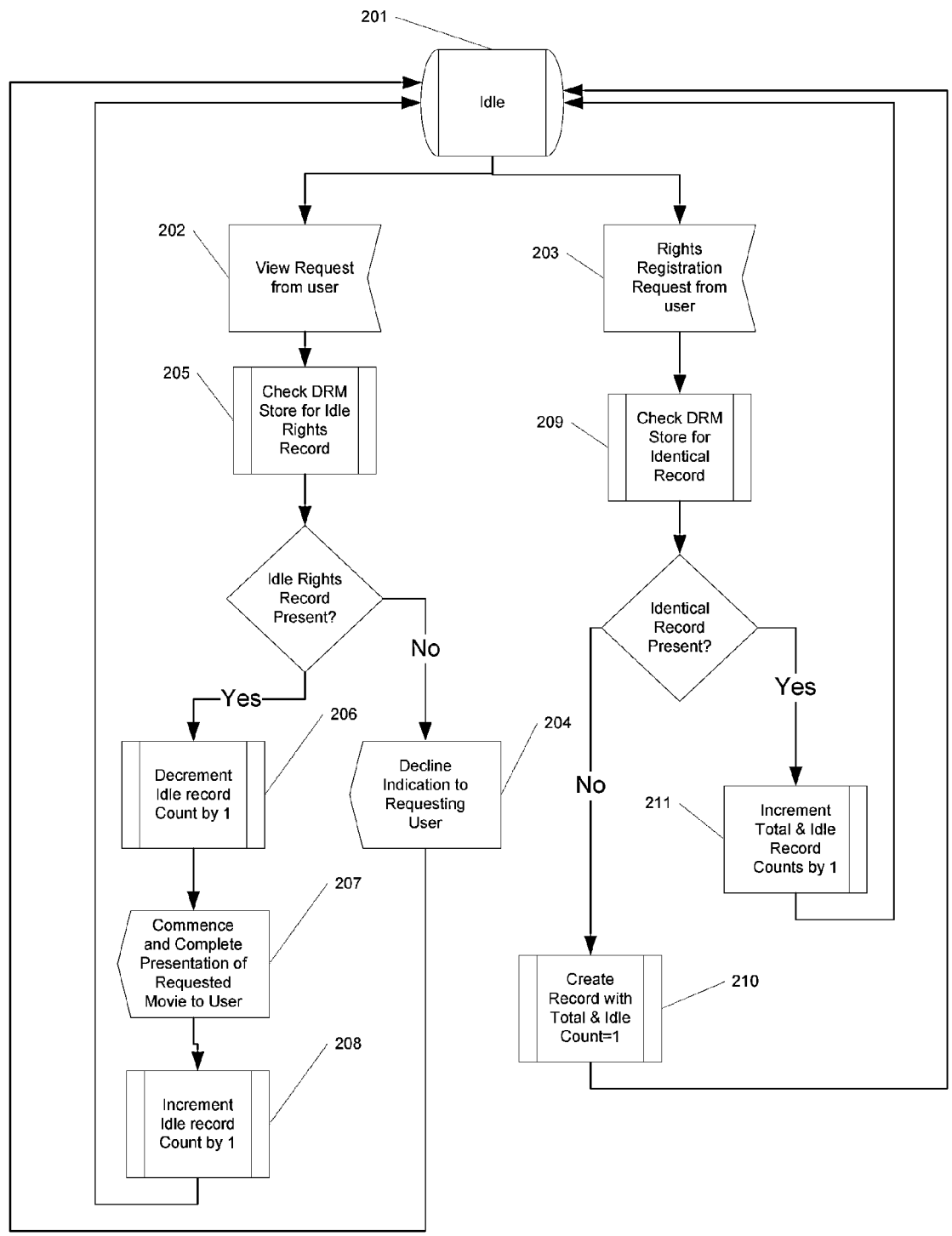
FIG. 2 is a block diagram of the logic employed in managing delivery of digital media and associated media rights

FIG. 2 is a decision flow diagram illustrating the logic employed by the process in server 102 to register records of ownership and authorize viewing of movies by users of the platform 100 according to this embodiment. This logic flow can be implemented in software using a standard programming language such as C++ ("The C++ Programming Language", Bjarne Stroustrup, Addison-Wesley, 1986) or a scripting language such as Ruby ("Everyday Scripting with Ruby: For Teams, Testers, and You", Brian Marick, Pragmatic Bookshelf, 2007) well known in the state of the art. State 201 of the process is labeled as the idle process which corresponds to the state where there is no outstanding user request to be completely processed such that the process is waiting idly for an incoming request to be processed. When there is a request 202 from a user such as 110 to view a movie such as "GHOSTBUSTERS", the process performs a check 205 on DRM store 104 to see if there is an idle record of rights for the requested movie. If for example this request came before the user 113 registered his ownership of this movie, then the check would return a negative indication that no currently idle rights exist for this movie and the process would return a decline indication 204 to user 110 that his request cannot be fulfilled at this time. If on the other hand, this request came in after the user 113 registered his ownership and before anyone else made the same request, the check will return a positive indication of availability of an idle rights record that can be used to fulfill this request. In that case, in step 206, the process will decrement the idle record count for this movie in the DRM store by one and start the process of streaming "GHOSTBUSTERS" movie to the requesting user 110 in step 207. Once the streaming presentation of this movie to user 110 is completed, this movie becomes available for another user to view and the idle rights record for the same movie is accordingly incremented back by one in step 208 and the process returns to the idle state 201. At this point it should be recognized that, although references are made in the foregoing to simply starting and stopping the streaming of a movie, performing this task with appropriate protections to avoid improper copying of the streamed content involves some complexity. Many different techniques have been proposed to perform this function in the prior art such as those in DeMello, et al., and are commonly used in the state of the art implementations.

When the user 110 makes the request 203 to register his ownership of the movie "GONE WITH THE WIND", the process checks DRM store 104 in step 209 to see if there is already a record for this movie. Since 110 is the first user to register this movie in our scenario, this check will return a negative indication so that the process will create in step 210 the digital copy of the requested movie in media store 103. Depending on business considerations, step 210 can be performed by prompting user 110 to enter his copy of the movie into his DVD drive and start uploading this movie over the Internet connection to the platform 100 or by connecting platform 100 to a central source provided by the copyright owner to accomplish the same download at a much faster rate or yet alternatively, procuring one physical copy of the same movie to be available locally to platform 100 such that the initial media record can be created by the entity managing platform 100. Following the creation of the media content in step 210, step 212 creates the initial rights of ownership record for this movie in the DRM store 104 with total count and idle count equal to 1. When user 111 subsequently makes the request 203 to register his ownership of the same movie, the same check 209 returns a positive indication so that all that is required is to increment the total and idle counts by one in step 211.

Figure 3:
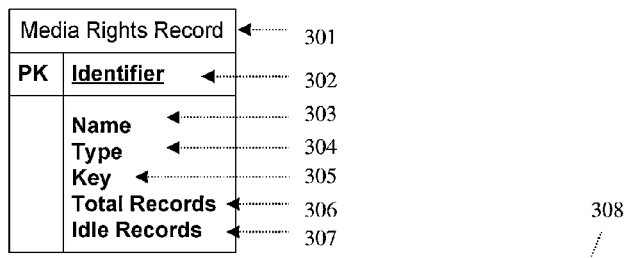
FIG. 3 is an example illustration of the database table holding records related to rights pertaining to media

FIG. 3 illustrates an example of how rights records could look when stored in a common relational database platform such as MySQL using Structured Query Language ("*SQL: The Complete Reference, Second Edition*", James Groff and Paul Weinberg, McGraw-Hill Osborne Media, 2002). Data stored in such databases are organized around tables in which records are stored with each distinct record corresponding to a row of the table. The structure of the rows is defined by columns each of which corresponds to a field or attribute of the record. The definition of the Table 301 "Media Rights Record" includes, columns "Identifier", "Name", "Type", "Key", "Total Records", "Idle Records" which correspond to attributes corresponding to each media rights record. The column "Identifier" is established as the "Primary Key" of this table which corresponds to the attribute uniquely identifying each row entry in the table, which in this case corresponds to each unique media record, such as a movie, song or a book. This "Identifier" can be structured as a binary string of sufficient length to cover all possible media records. For example a five byte long binary identifier would allow us to distinguish over 1 trillion media records and will likely be sufficient. The coding scheme used to encode the "Identifier" column can be custom and remain proprietary to a particular implementation of the platform 100. The important aspect of the coding scheme is that it identifies each distinct media record uniquely regardless of coincident names between movies and songs or between two movies where one is the remake of the other. One example encoding meeting this requirement would be to assign a unique coding to each unique combination of the "Name", "Type" and "Key" values.

The column 303 "Name" could be a text string spelling the name of the media record, e.g. "GONE WITH THE WIND". The column 304 "Type" could be the attribute identifying the type of media in the record such as a movie, song or a book. The values of the "Name" and "Type" columns can be entered by the users or extracted from the digital representation of the media during the creation of the media record but the value of the "Key" field always needs to be extracted in a secure manner invisible to the users. Considering the possibility of mistyping by users, preferred embodiments would extract all fields from the encoded content whenever possible instead of storing user entered information. Column 304 "Type" can be a binary string of short length, e.g. 4 bits, allowing for all possible media types. The column 305 "Key" could store a unique secret key in a binary string that can be used to verify physical presence of media in possession of users claiming ownership by comparing the key stored in the database 103 with that received from the user as will be discussed later. Column 306 "Total Records" could store the total count of rights claimed by all users and column 307 "Idle Records" could store the current count of all rights records that are not in use as explained above in the procedures associated with FIG. 2.

Table 308 in FIG. 3 further provides an example instantiation of the "Media Rights Record" Table 301. In this example, the different media records are identified with 40 bit binary sequences as shown in the first column "Identifier". The names of the different media items are entered in the second column "Name" as text strings. "Type" column 3 is implemented as a 4 bit binary sequence where the value "0000" is assigned the meaning "movie", "0001" is "song" and "0010" is "book". Fourth column "Key" has encryption keys associated with each media item that can be obtained only through access to a physical copy of the corresponding item. Columns 5 and 6 correspond to the count of "Total Records" and "Idle Records" as explained in conjunction with the logic flow of FIG. 2.

At this point, an expert experienced in the state of the art media technology and copyright rules may point out that it is not sufficient to ensure that the number of allowed simultaneous instances of independent online viewers be restricted only by taking into account the number of instances streamed online as in the preceding embodiment and that it is also necessary to take into consideration the possibility that one of the users 110-113 who actually hold the physical copy of the movie DVD may decide to show it to his guests on his home DVD player or lend it to his neighbor at the same time online requests are being made to view the same movie. Indeed, such uses of the original copy of the media needs to be accounted to conform to copyright rules. To that end, when the original copy of the media is in such active use, the idle rights record for that movie in DRM store 104 needs to be decremented by one to account for the use of the original copy.

Handling offline use of the original physical copies of the media in parallel with online streaming can be accomplished in a number of different ways. In another embodiment, a simple approach from a technical point of view would be to treat the burden of notification on the user holding the rights. In this embodiment, the user who owns the movie DVD and registers his rights with the platform 100 so that idle right records in store 104 is incremented for that movie, also registers his occasional use of the same movie so that idle rights record count is decremented by one during the period the original copy may be in offline use. In this manner, the availability of the rights to an idle copy of the media is treated consistently regardless of whether the user actually holds a physical copy to share with others or whether that physical copy is idle and not in use. This embodiment reasons that, if it is deemed sufficient evidence to satisfy the requirements of the copyright holder by evidence of the statement and identity of the registrant during the process of initial registration, then it would be consistent to accept the same as sufficient evidence during later use of the same content as well. Whether such self certified statements by clearly identified users are deemed sufficient by copyright holders is not a question of technology but rather one of business and law. It is therefore necessary for the invention to support scenarios where such evidence may not be deemed sufficient.

The present invention also supports embodiments where self certification of rights by users is not deemed sufficient by copyright holders or applicable regulations. In one such embodiment, a technical step is introduced to verify physical presence of the media to be in the user's possession during the process of registration of his ownership or during the initiation of streaming to another user to verify that the original media is idle and not being used.

Figure 4:
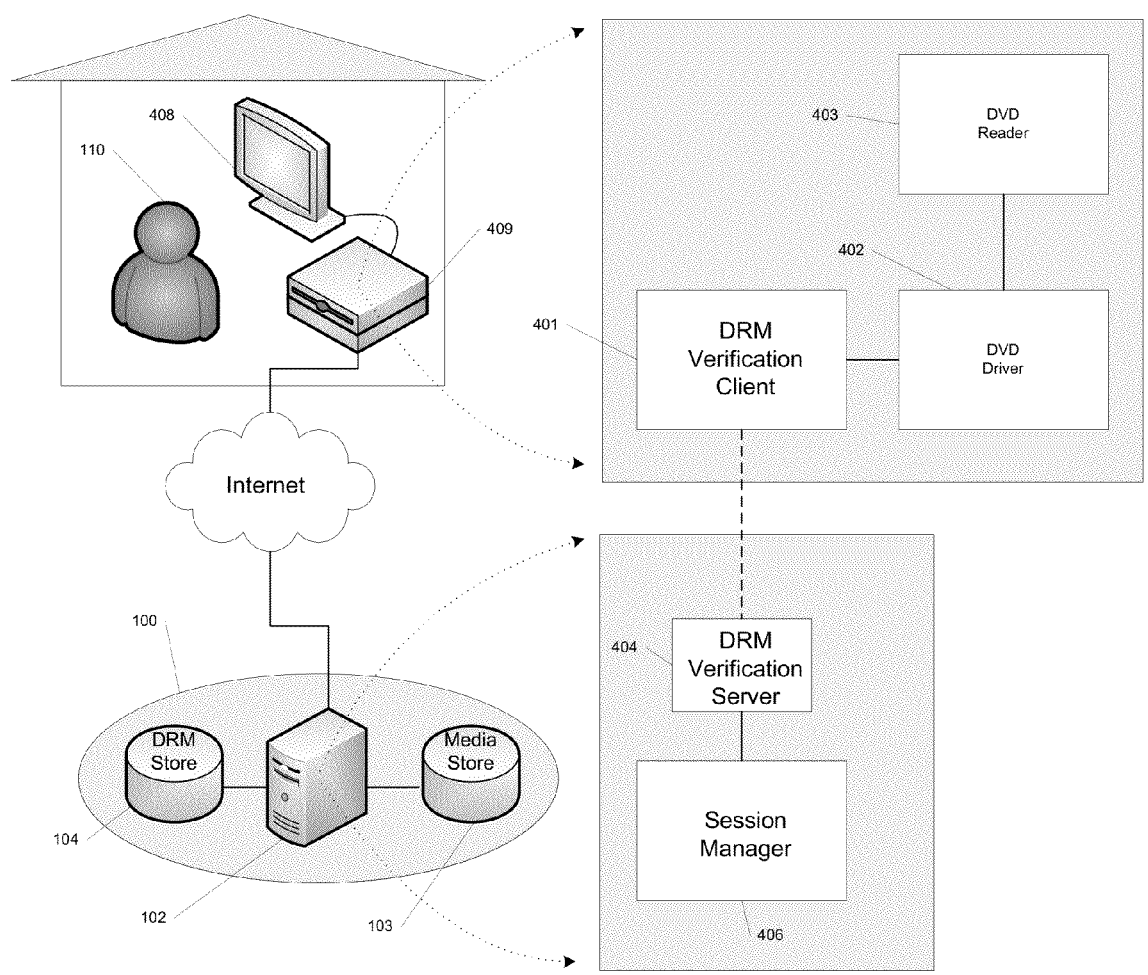
FIG. 4 is an illustration of an embodiment where registration and verification of available rights incorporate a physical verification step

FIG. 4 illustrates an embodiment providing such a technical solution for the step of verification. In this embodiment, a DRM Verification Client module 401 is implemented within the equipment 409 of user 110. The user equipment 409 can be a personal computer with a DVD drive or a self contained DVD player sold as a dedicated consumer product. In either case, the video output is connected to a display 408 where the user 110 can watch the movie stored in the DVD. Client module 401 interacts with a corresponding DRM Verification Server module 404 implemented within the media server 102 through a logical connection established within the Internet connection from equipment 409 to server 102. When user 110 initially logs in to the platform 100 through the server 102 to register his ownership and rights with respect to the movie "GONE WITH THE WIND", the session manager module 406 managing the overall interaction of the user with the platform 100 invokes the logical connection from the server verification module 404 to client verification module 401 requesting data to verify that a physical copy of the DVD 151 containing the movie "GONE WITH THE WIND" is present in the DVD drive of the user equipment 409. The movie "GONE WITH THE WIND" is identified by the server verification module by the "Key" sequence of Tables 301 and 308 that is assigned to this movie. This key sequence can be extracted from a corresponding field within the media record or through a specialized processing of the parts or whole of the actual encoded video. After receiving this request from module 404, module 401 examines the contents of the DVD in the reader 403 by reading it through the services provided by the DVD driver module 402 and extracts the key sequence associated with the DVD in the equipment 409 and returns this key sequence to module 404 through the logical connection between them. Client verification module 401 also verifies that the DVD inside reader 403 is idle and is not being accessed by another application and reports this fact along with the extracted key. For the first ever registration of a media record with a unique key, the key returned from the user equipment is stored as the unique key associated with the particular record as the media record itself is created for the first time. In subsequent registration attempts by other users, if the key sequence returned from module 401 of the user equipment matches the sequence stored in the "Key" column of the corresponding rights record stored previously, a positive result is declared for verification of the presence of the specified DVD in the attempting user's possession and the total available count is incremented accordingly.

Figure 5:
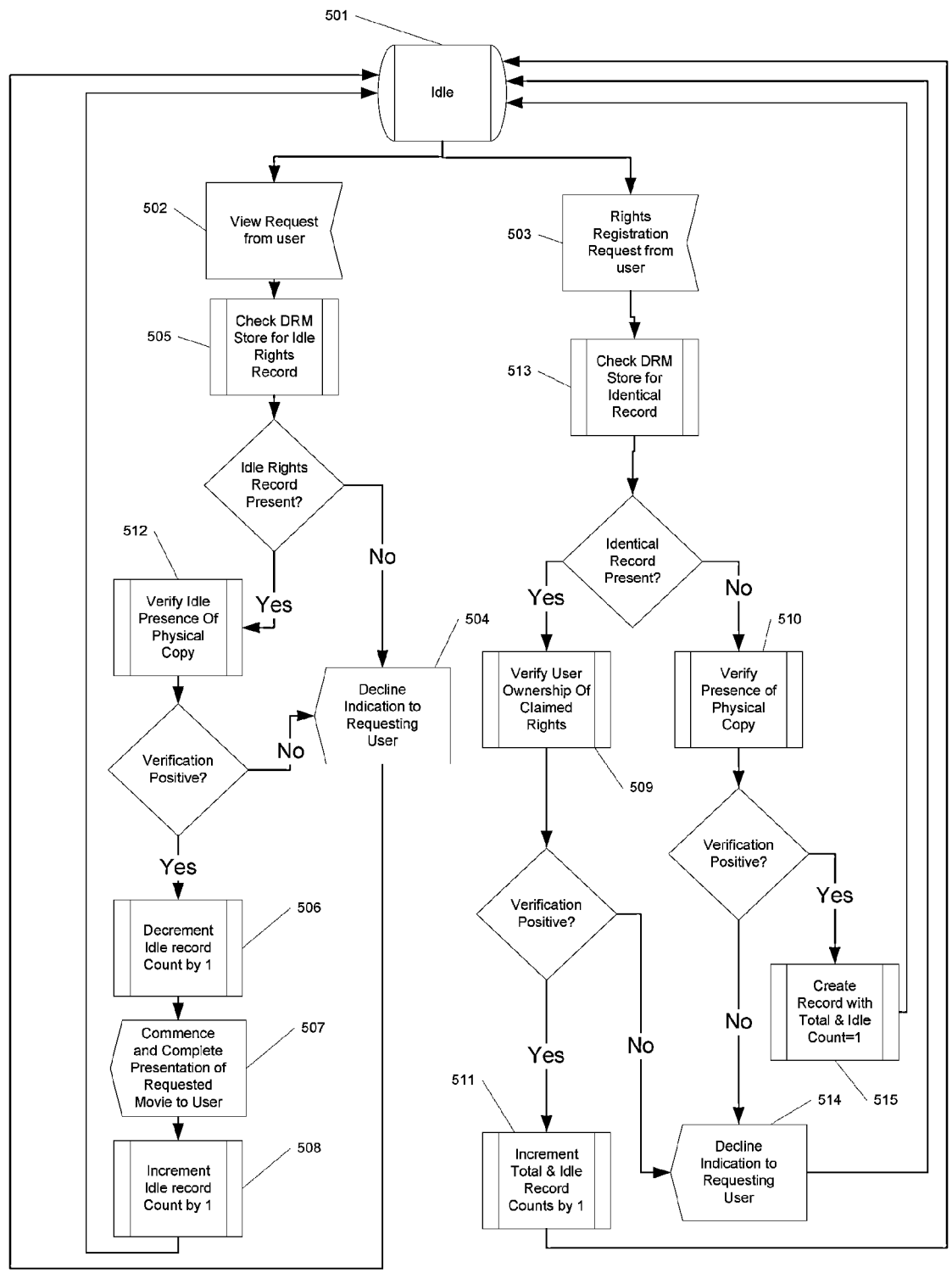
FIG. 5 is a block diagram of the logic employed in managing delivery of digital media and associated media rights incorporating a physical verification step

FIG. 5 illustrates the embodiment where the verification step outlined above is added to the logic employed by the process in server 101 to register records of ownership and authorize viewing of movies by users of the platform. In this embodiment, state 501 of the process is labeled as the idle process which corresponds to the state where there is no outstanding user request to be completely processed. When there is a request 502 from a user such as 110 to view a movie such as "GHOSTBUSTERS", the process performs a check 505 on DRM store 104 to see if there is an idle record of rights to the requested movie. If for example this request came before the user 114 registered his ownership of this movie, then the check would return a negative indication that no currently idle rights exist for this movie and the process would return a decline indication 504 to user 110 that his request cannot be fulfilled at this time. If on the other hand, this request came in after the user 114 registered his ownership and before anyone else made the same request, the check will return a positive indication of availability of an idle rights record that can be used to fulfill this request. In that case, the process will proceed to step 512 to verify that a physical copy of the requested movie is present and idle with the user 114 who originally registered his ownership of this movie. This is done in accordance with the steps outlined in FIG. 4. If this verification returns a positive result, the server proceeds to step 506 to decrement the idle record count for this movie in the DRM store by one and start the process 507 of streaming "GHOSTBUSTERS" movie to the requesting user 110. Otherwise, the request from user 110 is declined with indication 504. The present and idle status of the DVD with user 114 can be maintained by periodically performing the same checks and reporting the results to server verification module 404 as long as the streaming of the movie continues. Once the streaming presentation 507 of this movie to user 110 is completed, this movie becomes available for another user to view and the idle rights record for the same movie is accordingly incremented back by one in step 508.

When the user 110 makes the request 503 to register his ownership of the movie "GONE WITH THE WIND", the process performs check 513 to see if an identical record already exists in database 104. Since user 110 is the first user to register this movie in our scenario, the check 513 will return a negative indication so that the process will proceed to step 510 to verify that the user equipment has access to a physical copy of the claimed media record by extracting the key sequence as described in the procedures of FIG. 4. Since this is the initial registration of this particular movie, server 102 can only check the overall structure of the key to make sure it conforms to appropriate rules to be a valid key sequence for a DVD record of a movie. If no valid key sequence is obtained from the user equipment in step 510 following the procedures of FIG. 4, a decline indication 514 is returned to the user 110. If a valid key sequence is received, the initial rights of ownership record for this movie in the DRM store 104 is created with total count and idle count equal to 1 and the value of the received key is associated with this media record in step 515. When user 111 subsequently makes the request 503 to register his ownership of the same movie, the check 513 returns a positive indication. The process then proceeds to step 509 to validate the user's claim of rights according to the procedures of FIG. 4. Since there is already a key associated with this record during the initial registration, this validation is performed by comparing the key extracted in step 509 with the stored key. If a key with a valid structure is returned and the keys match, a positive verification is declared and total and idle counts are incremented by one in step 511. Otherwise, the request is declined. If the key has a valid structure but the keys do not match, an alternative embodiment can offer the possibility of registering the movie with a different "Identifier".

Example uses of the invention using visual content have been illustrated in the foregoing embodiments. The underlying concepts of the invention are applicable to media consisting of only audio or printed media equally well. In those embodiments, the users register ownership of audio CDs or e-books instead of DVDs of the foregoing embodiments and the server platform 100 streams audio tracks or serves text and images of a book.

While several embodiments of the invention have been described, it should be apparent that various modifications, alterations and adaptations to those embodiments may occur to persons skilled in the art with the attainment of some or all of the advantages of the invention. It is therefore intended to cover all such modifications, alterations and adaptations without departing from the scope and spirit of the present invention as defined by the appended claims.

What is claimed is:

1. A method of presenting media content to a first group of users over the Internet, comprising steps of:

uploading information regarding rights pertaining to said media content by a second group of users by verifying their rights to said media content through connecting electronic devices in their possession to the Internet and said electronic devices communicating over the Internet to a server information regarding the rights of said second group of users to said media content, said server tracking said information regarding rights of said second group of users with respect to said media content and deciding if making this content available to said first group users at the time of presenting would comply with copyright rules and if it does, presenting said media content to said first group of users while decrementing availability of presented media in accordance with copyright rules, said second group of users include at least one user who has purchased said media content distinct from said first group of users and said step of presenting depends on said rights of said second group of users as tracked and verified by said server and the number of said first group of users accessing said media content at the time of presenting; wherein, the first and second group of users are comprised of individuals distinct from corporations or enterprises.

2. The method of claim 1, wherein said digital media includes video.

3. The method of claim 1, wherein said digital media includes audio.

4. The method of claim 1, wherein said digital media includes text.

5. A system for presenting media content to a first group of users over the Internet, comprising:

one or more electronic devices of a second group of users, said electronic devices connecting to the internet and uploading to a server information regarding rights of said second group of users pertaining to said media content and, said server connected to the Internet receiving information regarding rights of said second group of users to verify their rights to said media content from said electronic devices in the possession of said second group of users and, said server receiving requests from said first group of users to access said media, deciding whether the requested access is in compliance with copyright rules at the time of presenting based on said information received from devices of said second group of users and if the access is in compliance, presenting said media content to said first group of users while decrementing availability of presented media in accordance with copyright rules, said second group of users include at least one user who has purchased said media content distinct from said first group of users and said deciding by the said server of compliance with copyright rules depends on said rights of said second group of users as tracked and verified by said server and the number of said first group of users accessing said media content at the time of presenting; wherein, the first and second group of users are comprised of individuals distinct from corporations or enterprises.

6. The system of claim 5, wherein said digital media includes video.

7. The system of claim 5, wherein said digital media includes audio.

8. The system of claim 5, wherein said digital media includes images.

9. The method of claim 1, wherein said first group of users and said second group of users have at least one person in common.

10. The method of claim 1, wherein both said first and second groups of users consist of one and the same individual person.

11. The system of claim 5, wherein said first group of users and said second group of users have at least one person in common.

12. The system of claim 5, wherein both said first and second groups of users consist of one and the same individual person.

13. The method of claim 1, wherein said first group of users and said second group of users have no person in common.

14. The system of claim 5, wherein said first group of users and said second group of users have no person in common.

* * * * *